United States Patent
Choi et al.

(10) Patent No.: US 7,290,884 B2
(45) Date of Patent: *Nov. 6, 2007

(54) DISPLAY DEVICE HAVING RESOLUTION IMPROVING APPARATUS FOR PROJECT-TYPE DISPLAY DEVICE

(75) Inventors: In Ho Choi, Sungnam-si (KR); Sam Nyol Hong, Suwon-si (KR); Young Joong Kim, Seoul (KR); Hee Sool Koo, Sungnam-si (KR)

(73) Assignee: LG Electronics Inc., Seoul (KR)

( * ) Notice: Subject to any disclaimer, the term of this patent is extended or adjusted under 35 U.S.C. 154(b) by 278 days.

This patent is subject to a terminal disclaimer.

(21) Appl. No.: 11/024,693

(22) Filed: Dec. 30, 2004

(65) Prior Publication Data

US 2005/0259227 A1    Nov. 24, 2005

(30) Foreign Application Priority Data

May 27, 2004    (KR) ...................... 10-2004-0037918

(51) Int. Cl.
G03B 21/26 (2006.01)
H04N 3/22 (2006.01)
G02F 1/1335 (2006.01)
G02B 26/08 (2006.01)

(52) U.S. Cl. ................. 353/34; 353/122; 348/745; 349/57; 359/197; 359/209

(58) Field of Classification Search ............... 353/28, 353/69, 30, 82, 88–92, 94, 97, 101, 122, 353/34; 348/745, 747, 771, 792, 828; 359/197–200, 359/209, 210, 212–214, 220, 221, 223; 349/57
See application file for complete search history.

(56) References Cited

U.S. PATENT DOCUMENTS

| 4,285,566 | A  | * | 8/1981  | Yamamoto ................. 359/214 |
| 6,577,429 | B1 | * | 6/2003  | Kurtz et al. ................ 359/279 |
| 7,046,407 | B2 | * | 5/2006  | Conner ........................ 359/15 |
| 2002/0075786 | A1 | * | 6/2002 | Ikegame ..................... 369/221 |
| 2004/0223126 | A1 | * | 11/2004 | Hatakeyama et al. ....... 353/122 |
| 2005/0128438 | A1 | * | 6/2005 | Kang et al. .................. 353/69 |
| 2005/0243290 | A1 | * | 11/2005 | Gupta ......................... 353/99 |

FOREIGN PATENT DOCUMENTS

JP    7-43672 A    2/1995

* cited by examiner

Primary Examiner—W. B. Perkey
Assistant Examiner—Andrew T Sever
(74) Attorney, Agent, or Firm—Birch, Stewart, Kolasch & Birch, LLP

(57) ABSTRACT

A concept of improving a resolution by using human's visual characteristics is provided. Bu the present invention, an image can be displayed at a more improved resolution than an actual physical resolution, thereby obtaining the same effect that the resolution is physically improved. An image signal corresponding to one frame is split into a first image signal and a second image signal, and a first image and a second image are formed based on the first image signal and the second image signal. Then, the first image and the second image are respectively displayed at a first location and a second location. As a result, a viewer can view the image at an improved resolution.

20 Claims, 9 Drawing Sheets

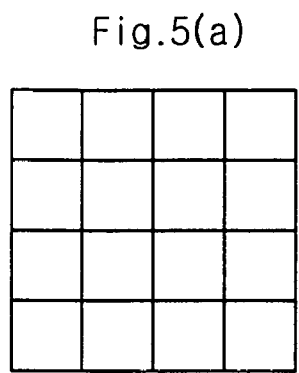
Fig.5(a)
Image signal of
one frame
(T=0~T1)
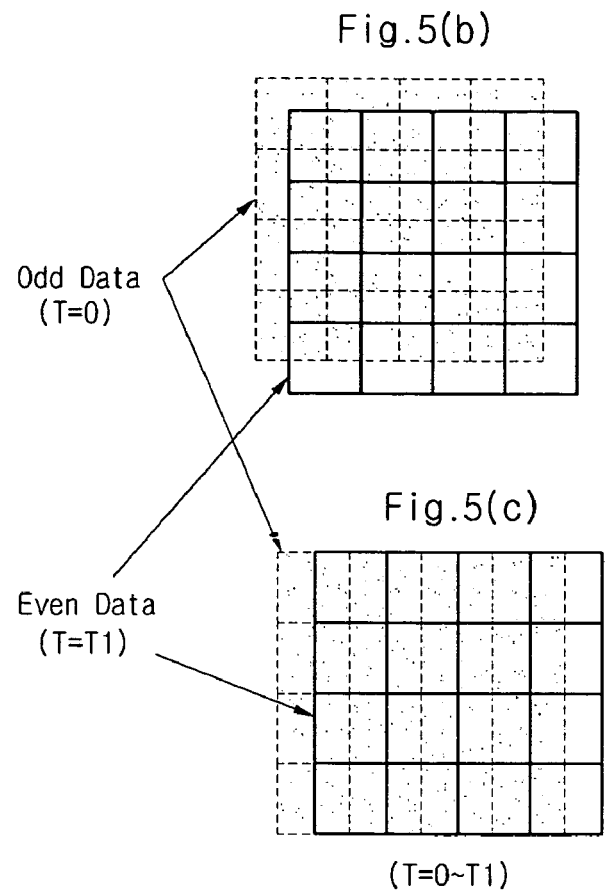
Fig.5(b)
Odd Data
(T=0)
Even Data
(T=T1)
Fig.5(c)
(T=0~T1)
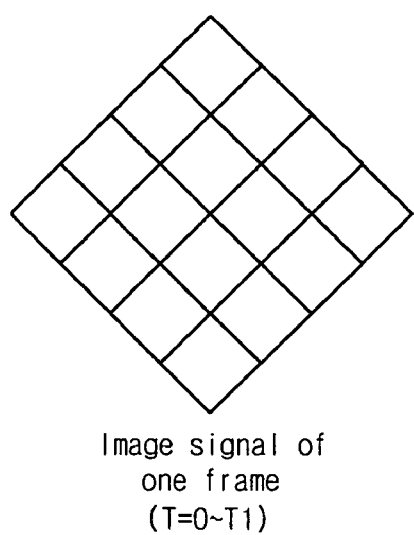
Fig.6(a)
Image signal of
one frame
(T=0~T1)
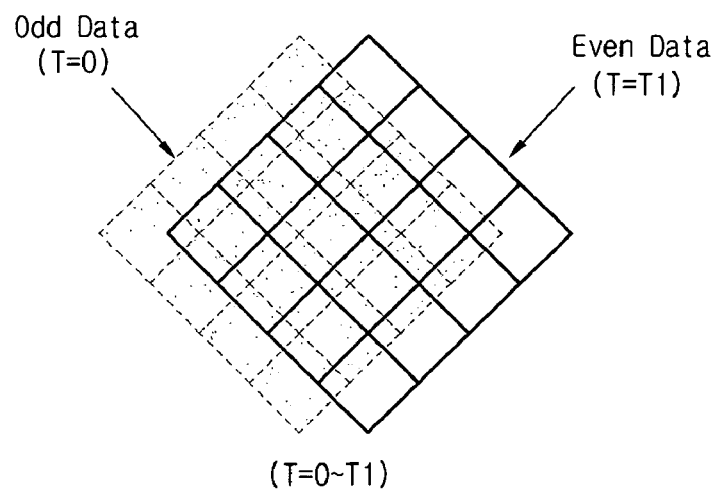
Fig.6(b)
Odd Data
(T=0)
Even Data
(T=T1)
(T=0~T1)

Odd Data Image

Even Data Image

DISPLAY DEVICE HAVING RESOLUTION IMPROVING APPARATUS FOR PROJECT-TYPE DISPLAY DEVICE

This application claims the priority benefit of Patent Application No. 10-2004-0037918 filed on May 27, 2004 in Republic of Korea, which is hereby incorporated by reference.

BACKGROUND OF THE INVENTION

1. Field of the Invention

The present invention relates to a display device, and more particularly, to a display device having a resolution improving apparatus which is capable of effectively improving a resolution of a projection-type display device.

2. Description of the Related Art

Recently, display devices tend to be lightweight, slim and large-sized. Specifically, large-screen display devices have become important in the display fields.

With the advent of digital broadcasting, a projection-type display device requires a high resolution.

SUMMARY OF THE INVENTION

Accordingly, the present invention is directed to a display device and method that substantially obviate one or more problems due to limitations and disadvantages of the related art.

An object of the present invention is to provide a display device and method which are capable of effectively improving a resolution with a simple structure and operation.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display device according to an aspect of the present invention includes: a light source; an image forming unit for forming an image by using a light emitted from the light source and an inputted image signal; a projection unit for projecting the image formed by the image forming unit onto a screen; a movable displacement unit for displacing the image displayed onto the screen; and a driving unit for driving the displacement unit, wherein the displacement unit include: a fixing member; a rotating member coupled to the fixing member and to which a displacement plate is fixed; and a supporting member for supporting the rotating member by an elastic force.

In another aspect of the present invention, a display device includes: a light source; an image forming unit for forming an image by using a light emitted from the light source and an inputted image signal; a projection unit for projecting the image formed by the image forming unit onto a screen; an optical path changing unit disposed on an optical path through which the image is projected, for changing an optical path; and a driving unit for driving the optical path changing unit, wherein the optical path changing unit includes: a fixing member disposed on the optical path; a rotating member rotatably coupled to the fixing member and to which a displacement plate is fixed; and a supporting member for supporting the rotating member by an elastic force.

In a further another aspect of the present invention, a display device includes: a light source; an image forming unit for forming an image by using a light emitted from the light source and an inputted image signal; a projection unit for projecting the image formed by the image forming unit onto a screen; a displacement unit rotatably coupled to displace the image displayed on the screen, at least a portion of the displacement unit being supported by an elastic member, such that the displacement unit is freely rotatable; and a driving unit for driving the optical path changing unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 5(a)-5(c) and 6(a)-6(b) are views illustrating different examples of a displacement of light projected onto a screen depending on the motion of the displacement plate in the display device according to the present invention;

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

A resolution is the number of pixels per square inch on a display device. That is, the resolution is used as a scale representing precision in displaying an image.

In order to improve the resolution, a conventional display device uses a physical method of increasing the number of pixels. However, the present invention improves the resolution by using human's visual characteristics.

According to the present invention, an image can be viewed at a more improved resolution compared with an actual physical resolution, thereby obtaining the same effect that the resolution is physically improved.

Although described below in detail, an image signal corresponding to one frame is split into sub images, e.g., a first image signal and a second image signal. The first image signal and the second signal are respectively displayed as a first image and a second image at a first position and a second position of a screen, such that a viewer feels as if the resolution is improved.

For example, the first position and the second position on the screen may have a gap below or above a size of one pixel and may be spaced apart in a vertical, horizontal or diagonal direction.

Specifically, according to the present invention, an optical path changing unit is used to make the first image and the second image to be displayed respectively at the first position and the second position of the screen.

The optical path changing unit uses a light transmitting element and the optical path is changed depending on the displacement position and displacement angle of the light transmitting element.

Figure 1:
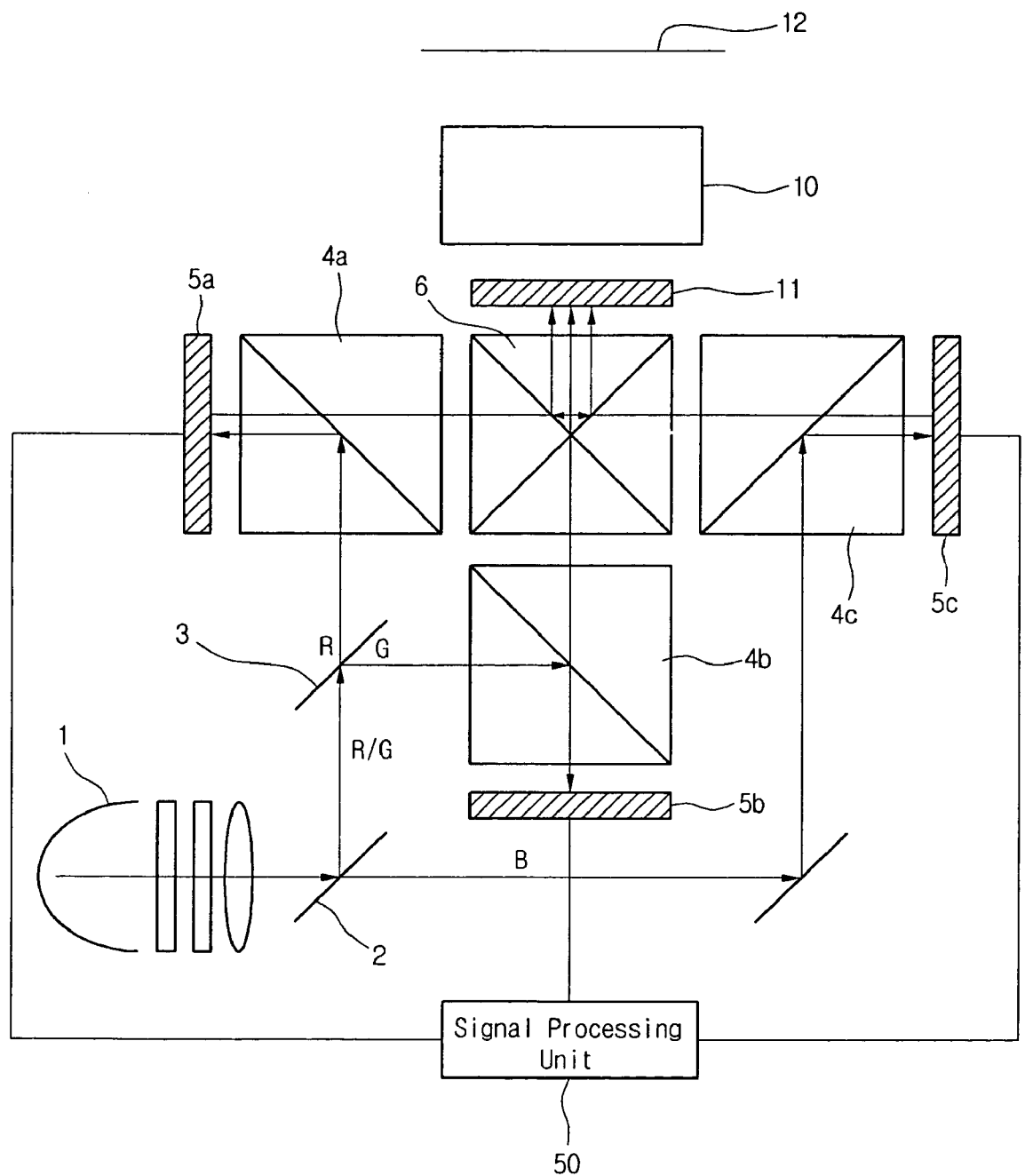
FIG. 1 is a view of a display device having a resolution improving apparatus according to an embodiment of the present invention.

FIG. 1 is a view of a display device having a resolution improving apparatus according to an embodiment of the present invention. All the components of the display device are operatively coupled.

In FIG. 1, there is shown an illuminating system of a projection TV using a reflection-type liquid crystal display (LCD). In the reflection-type illuminating system of a 3 PBS (polarized beam splitter) system shown in FIG. 1, a light irradiated from a lamp 1 passes through a condensing lens and is incident on a first dichroic mirror 2. The first dichroic mirror 2 reflects red and green lights R and G and transmits a blue light B.

Then, the reflected red and green lights R and G are incident on a second dichroic mirror 3. The second dichroic mirror 3 transmits the red light R to a first PBS 4a and reflects the green light G onto a second PBS 4b. The blue light B from the first dichroic mirror 2 impinges on a third PBS 4C, e.g., through a reflecting mirror. As a result, the red, green and blue lights R, G and B are respectively incident on the first, second and third PBSs 4a, 4b and 4c, which are disposed respectively in front of first, second and third LCD panels 5a, 5b and 5c.

The red, green and blue lights R, G and B incident on the first, second and third PBSs 4a, 4b and 4c are reflected and then incident on the first, second and third LCD panels 5a, 5b and 5c, respectively. Phases of the red, green and blue lights R, G and B are changed respectively by the first, second and third LCD panels 5a, 5b and 5c. Then, the red, green and blue lights R, G and B having the changed phases are reflected from the LCD panels 5a, 5band 5c and transmitted respectively through the first, second and third PBSs 4a, 4b and 4c.

Images are displayed on the first, second and third LCD panels 5a, 5b and 5c, depending on image signals inputted from a signal processing unit 50.

The red, green and blue images, transmitted through the first, second and third LCD panels 5a, 5b and 5c and then through the first, second and third PBSs 4a, 4b and 4c, are combined by an X-prism 6. Then, the combined images pass through a displacement plate 11 and are incident on a projection lens 10.

The images passing through the projection lens 10 are projected onto a screen 12.

At this point, the displacement plate 11 may be disposed between the X-prism 6 and the projection lens 10, or between the projection lens 10 and the screen 12.

The displacement plate 11 is a thin-plate shaped element that can transmit light. A higher resolution can be implemented by changing the position or angle of the displacement plate 11.

In addition, although the illuminating system using the reflection-type LCD, the dichroic mirror and the PBSs is shown in FIG. 1, a transmission-type LCD instead of the reflection-type LCD can also be used. A liquid crystal on silicon (LCoS) can also be used as the reflection-type LCD.

Further, although three LCD panels are shown in FIG. 1, only one LCD panel can also be used and a structure of the optical system can be variously modified.

Furthermore, the present invention can be applied to a projector as well as a projection TV.

That is, the present invention may be embodied in many different forms and should not be construed as being limited to the embodiments set forth herein.

Figure 2:
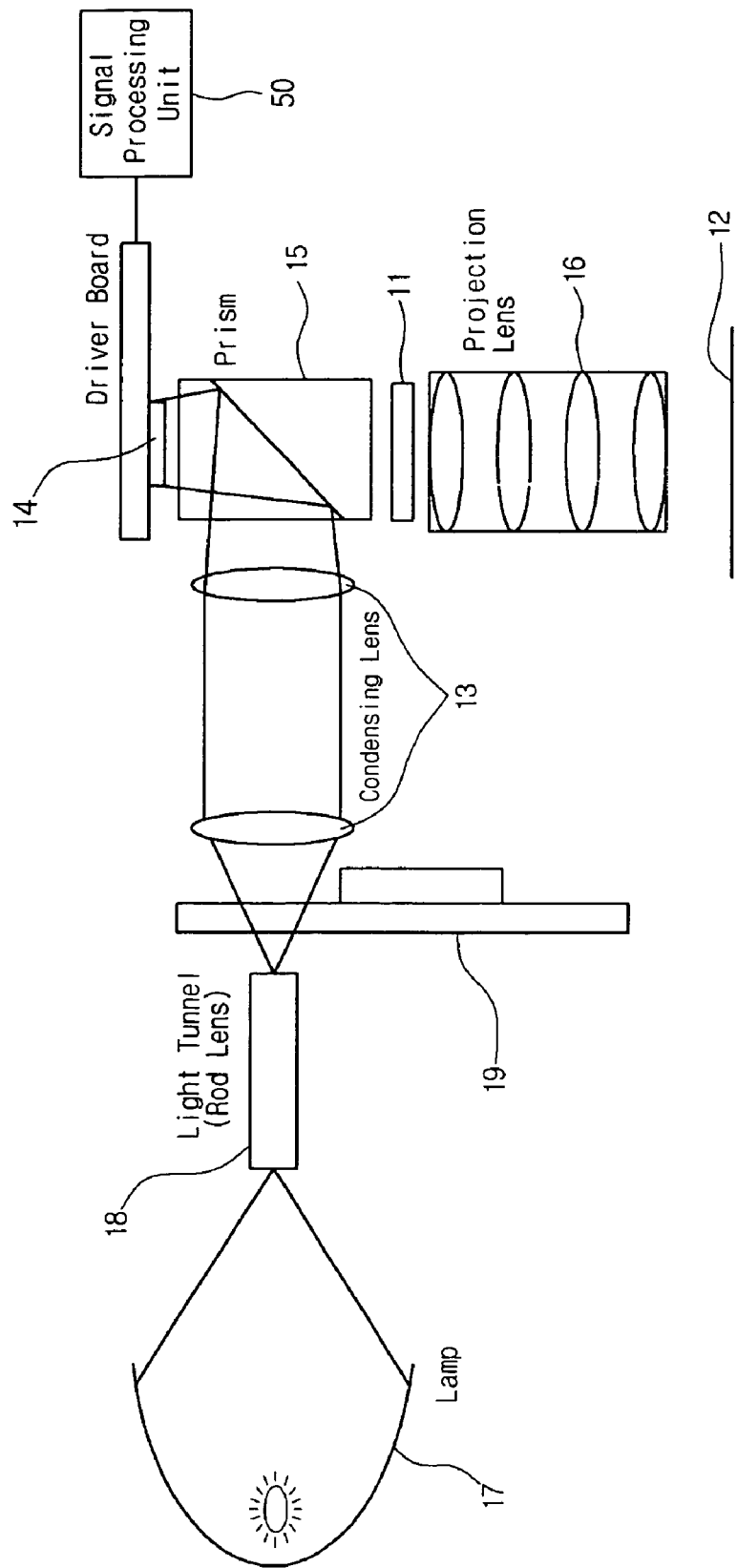
FIG. 2 is a view of a display device having a resolution improving apparatus according to another embodiment of the present invention.

FIG. 2 is a view illustrating a display device according to another embodiment of the present invention. More specifically, a digital light processing (DLP) optical system according to the present invention will be described below in detail with reference to FIG. 2.

The DLP optical system provides light to be irradiated to a digital micromirror device (DMD) 14 and determines whether to allow the respective micromirrors in the DMD 14 to irradiate the light to a screen in an on-state or to irradiate the light to a non-screen in an off-state, depending on image signals.

Referring to FIG. 2, the DLP optical system includes a lamp 17, a rod lens 18, a color wheel 19, a condensing lens 13, a prism 15, a DMD 14, a displacement plate 11, and a projection lens 16. All the components of the DLP optical system are operatively coupled.

The lamp 17 generates light and the rod lens 18 transmits the light generated from the lamp 17. The color wheel 19 splits a white light passing through the rod lens 18 into red, green and blue lights. The condensing lens 13 condenses the lights passing through the color wheel 19, and the prism 15 reflects the condensed lights onto the DMD 14. The DMD 14 irradiates the reflected lights towards a screen 12. The displacement plate 11 displaces the lights reflected from the DMD 14, depending on time. The projection lens 16 magnifies the lights passing through the displacement plate 11 and projects the magnified lights onto the screen 12.

Based on such a structure, an operation of the DLP optical system will be now described below.

A white light emitted from the lamp 17 is focused by an inner curvature of a reflector and the focused light passes through a light tunnel or rod lens 18.

The rod lens 18 is provided by attaching four small and elongated mirrors to one another. The light passing through the rod lens 18 is scattered and reflected such that its brightness is uniformly distributed. The brightness of the light that will be finally projected onto the screen 12 needs to be uniform. The rod lens 18 performs this function so that it is an important optical element in a projection-type display device.

The light passing through the rod lens 18 is transmitted through the color wheel 19 for the color separation. The color wheel 19 rotates according to a vertical synchronization of the image.

Then, the light passes through the condensing lens 13 and is reflected by the prism 15, so that the light is directed to the DMD 14. The prism 15 can totally reflect or transmit the light, depending on an incident angle of the light.

The light incident on the DMD 14 is redirected toward the screen 12, depending on the on/off state of the micromirrors of the DMD 14 controlled in response to sampled pixel values. The DMD 14 changes into the on- or off-state depending on image signals inputted from a signal processing unit 50. In this manner, a predetermined image is formed.

The image reflected from the DMD 14 and directed to the screen 12 passes through the displacement plate 11 and the projection lens 16. In this course, the image is enlarged and projected onto the large screen 12.

The displacement plate 11 may be disposed between the prism 15 and the projection lens 16, or between the screen 12 and the projection lens 16. Also, the displacement plate 11 may be disposed between the DMD 14 and the prism 15.

The light is projected onto different locations on the screen 12 depending on the periodical change in the position and/or angle of the displacement plate 11.

According to the embodiments of FIGS. 1 and 2, the displacement plate 11 may be disposed at a predetermined position between the screen and the image forming unit for forming the image through the R, G and B combination. The displacement plate 11 is part of the resolution improving apparatus.

Meanwhile, in the image forming unit shown in FIGS. 1 and 2, the image signal corresponding to one frame is split into the first image signal and the second image signal by the signal processing unit 50. Then, the first image signal and the second image signal are transformed as the first image and the second image by the R, G and B combination, respectively.

In FIG. 1, the image forming unit may be provided with the first, second and third LCD panels 5a, 5b and 5c, the first, second and third PBSs 4a, 4b and 4c and the X-prism 6.

In FIG. 2, the image forming unit may be provided with the color wheel 19, the condensing lens 13 and the DMD 14.

In the present invention, an image signal corresponding to one frame is split into a plurality of image signals and processed into a plurality of images and then displayed. In this case, the image signal corresponding to one frame may be split into "n" image signals and processed into "n" images and then displayed at "n" or less different positions on the screen.

According to the present invention, a display time of one image is equal to a time given by dividing a display time of one frame image by the number of images.

The present invention makes the viewer feel as if the resolution is improved by splitting the image signal corresponding to one frame into the first image signal and the second image signal (or "n" image signals), processing the first image signal and the second image signal into the first image and the second image and then sequentially displaying the first image and the second image at first and second positions of the screen.

Figure 3:
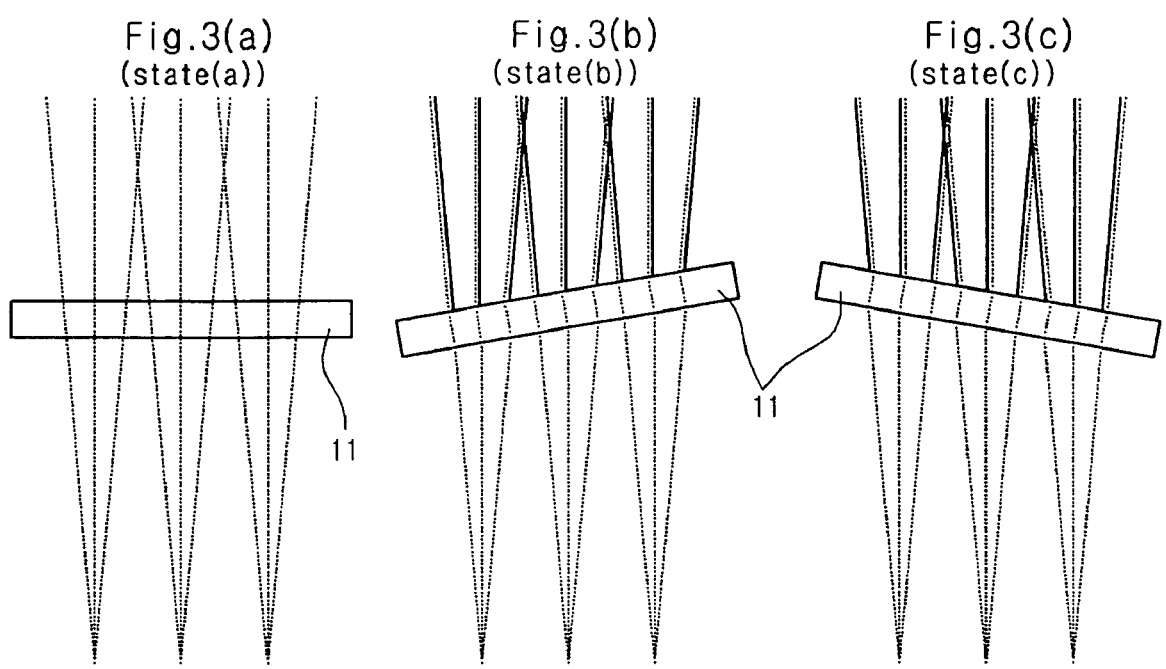
FIGS. 3(a)-3(c) are views illustrating an operation of a displacement plate in the display device according to the present invention.

FIG. 3 is a view illustrating an operation of the displacement plate 11 in the display device of FIG. 1 or 2 according to the present invention.

Particularly, FIG. 3(a) shows a case that there is no displacement plate 11 or there is no motion of the displacement plate 11. In this case, the image projected from the prism or the projection lens is displayed at the same position of the screen.

FIG. 3(b) shows a case that the displacement plate 11 is rotated in a counterclockwise direction, and FIG. 3(c) shows a case that the displacement plate 11 is rotated in a clockwise direction.

If the displacement plate 11 changes from the state (a) to the state (b) or (c), the image is refracted while passing through the displacement plate 11, such that the image is displayed onto different positions of the screen.

That is, since the displacement plate 11 is operated as an optical path changing unit, the projected image is displaced due to the displacement plate 11 and is thus displayed onto a different position of the screen depending on the motion of the displacement plate 11. Thus, the displacement plate 11 according to the present invention acts as the image displacement unit to make the image to be displayed onto different positions of the screen.

Figure 4:
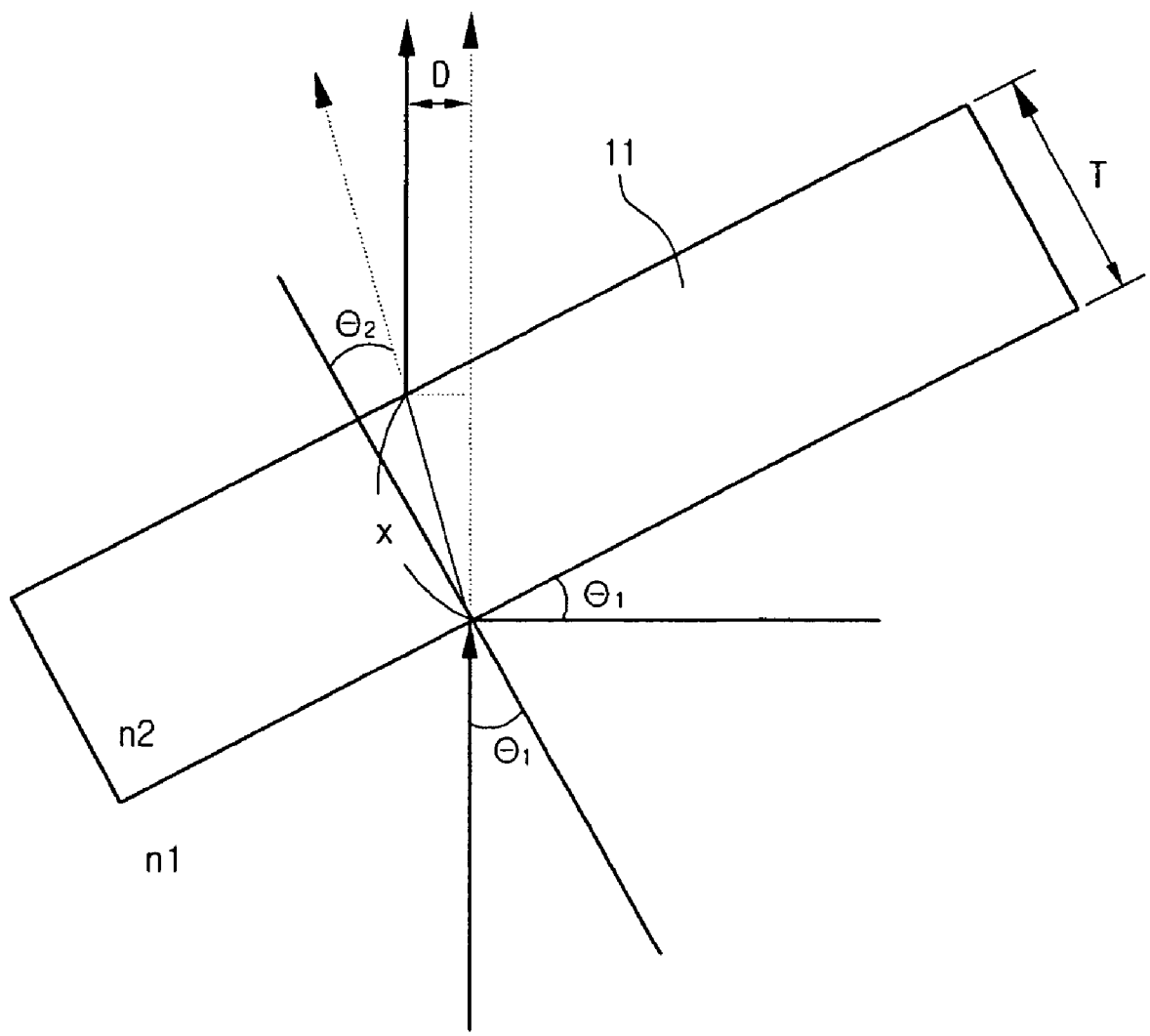
FIG. 4 is a view illustrating an operation principle of the displacement plate acting as an image displacement unit in the display device according to the present invention.

FIG. 4 is a view illustrating an operation principle of the displacement plate 11 acting as an image displacement unit in the display device according to the present invention.

A motion degree of the light on the screen 12 can be calculated depending on the displacement plate's thickness T, tilt angle (light incident angle) $\theta_1$ and refractive index $n_2$. The displacement plate's thickness, tilt angle and refractive index can be determined depending on the required motion degree of the light on the screen 12.

The displacement plate's thickness, tilt angle and refractive index can be derived from Snell's law given by Equation 1 below.

$$n_1 \sin \theta_1 = n_2 \sin \theta_2 \qquad \text{[Equation 1]}$$

where, $n_1$ is the refractive index of air;
$n_2$ is the refractive index of the displacement plate;
$\theta_1$ is the incident angle of light; and
$\theta_2$ is the refraction angle of light.

Thus, the optical path difference D between the lights passing through the displacement plate 11 can be given by Equation 2 below.

$$D = \frac{T}{\cos\theta_2}\sin(\theta_1 - \theta_2) \qquad \text{[Equation 2]}$$

$$\cos\theta_2 = \frac{T}{x}, \; \sin(\theta_1 - \theta_2) = \frac{D}{x}, \; \theta_2 = \sin^{-1}\left(\frac{n_1 \sin\theta_1}{n_2}\right)$$

where T is the thickness of the displacement plate;
$n_1$ is the refractive index of air;
$n_2$ is the refractive index of the displacement plate;
$\theta_1$ is the incident angle of light;
$\theta_2$ is the refraction angle of light; and
x is the length of the optical path of the refracted light within the displacement plate.

In addition, the optical path difference D between the lights passing through the displacement plate 11 determines the displacement of the lights actually displayed onto the screen 12, depending on magnification of the projection lens.

It is preferable that the refractive index of the displacement plate 11 falls within the range from 1.4 to 2.0.

The present invention uses the light transmitting element and the light refraction so as to make the optical path difference D.

However, the present invention encompasses using a reflection mirror to change the optical path. That is, if the reflection angle of the light is changed, the optical path of the reflected light can be changed depending on the angles of the reflection mirror as disposed on the optical path.

According to the method of changing the optical path using the reflection, the change in the optical path is sensitive to the change in the angle of the reflection mirror, compared with the method of changing the optical path using the light refraction. Therefore, a precise control is required if the reflection is used to change the optical path.

According to the present invention, the displacement degree of the image may be more than or less than a size of one pixel. However, since the displacement degree of the image is small, the optical path changing unit must be precisely controlled so that the image projected from the projection lens can be displaced within a small range.

Therefore, the optical path changing unit using the light transmitting element has advantages in that it can be easily manufactured and the error probability is greatly reduced.

Specifically, as shown in FIG. 4, if the light is incident onto the same position of the light transmitting element, the optical path difference D occurs but the traveling direction of the light does not change.

In the case of using the reflection mirror as the optical path changing unit, even if the light is incident onto the same position of the reflection mirror, the traveling direction of the light is changed depending on the angles of the reflection mirror, such that a more precise control is required.

FIGS. 5 and 6 are views illustrating examples of the displacement of lights projected onto the screen depending on the motion of the displacement plate 11 in the display device according to the present invention.

Referring to FIG. 5, in the display device having a rectangular pixel structure, the displacement plate 11 periodically moves and thus the positioning of the image on the screen 12 moves.

Referring to a conventional pixel structure of FIG. 5(a), the same image is displayed at the same corresponding positions on the screen during a predetermined time (T=0-T1). However, referring to FIGS. 5(b) and 5(c), different images are displayed at different positions on the screen at time T=0 and T=T1. Thus, a double resolution can be recognized using the same number of pixels.

For example, the image signal of one frame is split into the first and second image signals. Then, when the image of one frame is to be displayed, the first and second image signals are combined and displayed in sequence.

For example, assume that the same image information is displayed during 1/60 second in the related art. According to the present invention, the image information is split into a first image information and a second image information, and then the first image information and the second image information are respectively displayed at the first and second positions on the screen, each image information for 1/120 second.

FIG. 7 is an exemplary view of a first image and a second image split from the image corresponding to one frame according to the present invention.

Figure 7A:
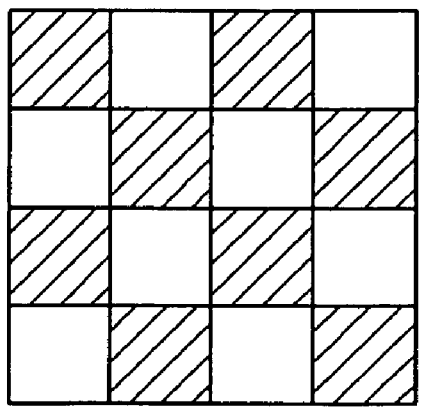
FIGS. 7(a) and 7(b) are views of respectively a first image and a second image displayable using the display device according to the present invention.
Figure 7B:
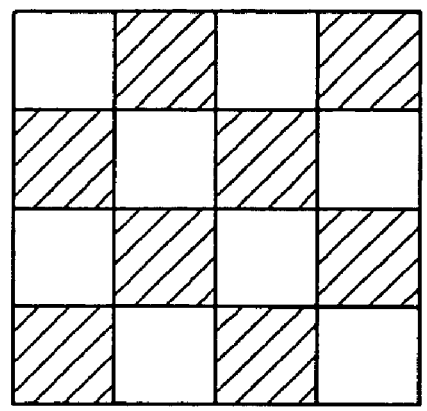

As shown in FIGS. 7(a) and 7(b), the image corresponding to one frame can be split into the first image (e.g., odd data) and the second image (e.g., even data), and the first image and the second image can be split depending on the positions of the pixels.

The positions at which the first image (odd data) and the second image (even data) are displayed can be displaced by the displacement plate 11.

Returning to FIG. 5(b), the display positions of the first image (odd data) and the second image (even data) are displaced in a diagonal direction. In FIG. 5(c), the display positions of the first image (odd data) and the second image (even data) are displaced in a horizontal direction.

FIG. 6 shows the position of the image displayed onto the screen depending on time in a rhombus pixel structure.

Referring to a conventional pixel structure of FIG. 6(a), the same image is displayed at the same position during a predetermined time (T=0-T1). However, similar to FIGS. 5(b) and 5(c), as shown in FIG. 6(b) different images are displayed at different positions of the screen at time T=0 and T=T1. Thus, according to the present invention, a double resolution can be recognized using the same number of pixels.

According to the present invention, the displacement/ movement/oscillation of the optical path changing unit such as the displacement plate 11 in the display device is achieved using a resolution improving apparatus shown in FIGS. 8-12. The resolution improving apparatus holds a displacement plate 31 (e.g., the displacement plate 11 in FIG. 1 or 2) and displaces the plate 31 periodically during a certain time duration to provide the improved resolution effect, as discussed above.

Figure 8:
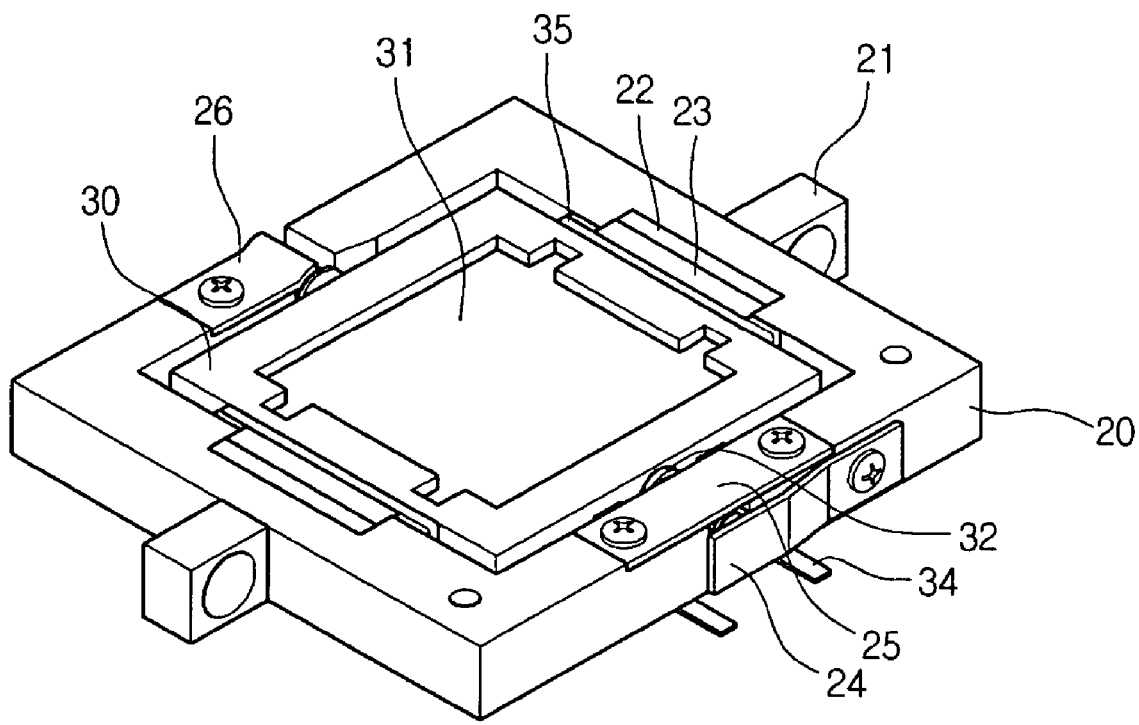
FIG. 8 is a perspective view of a resolution improving apparatus according to the present invention.
Figure 9:
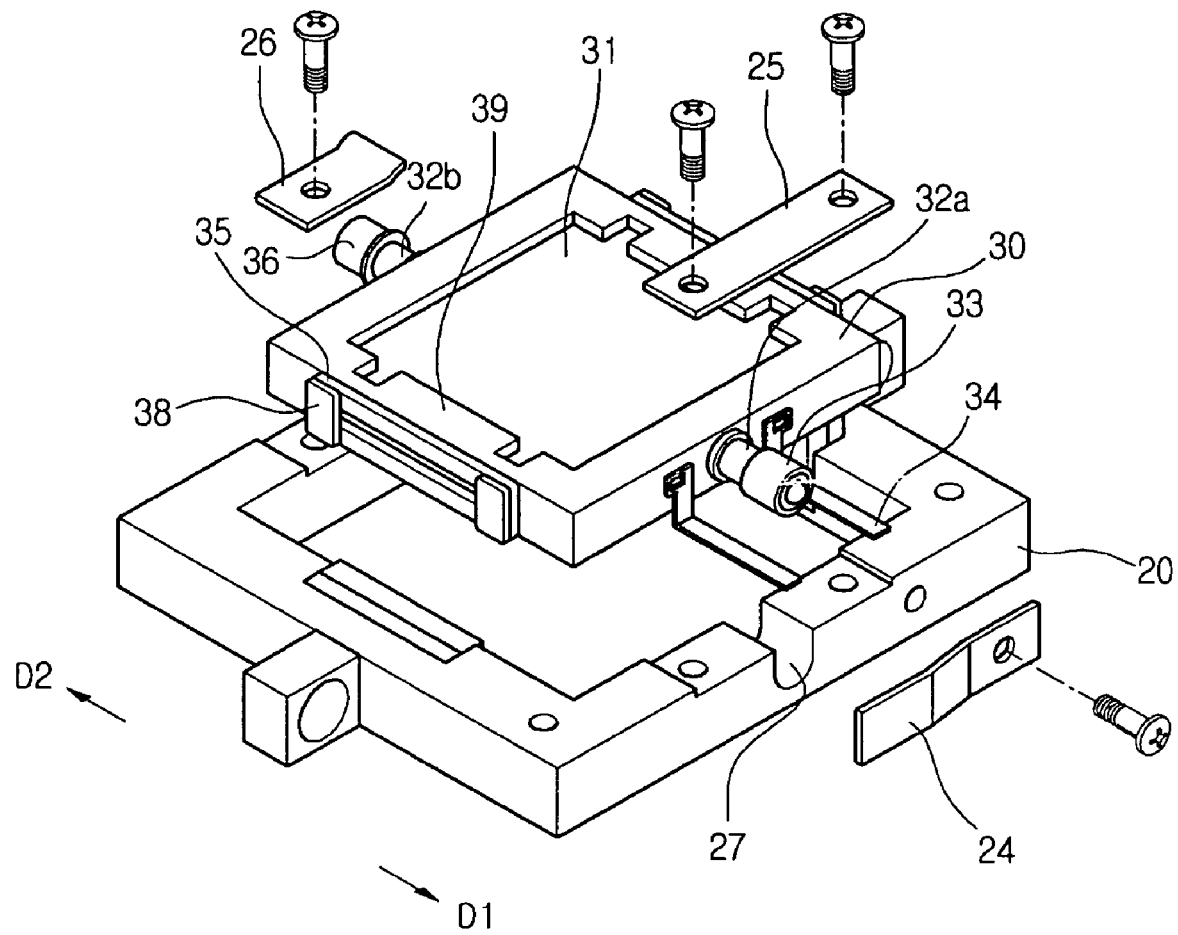
FIG. 9 is an exploded perspective view of the resolution improving apparatus shown in FIG. 8.
Figure 10:
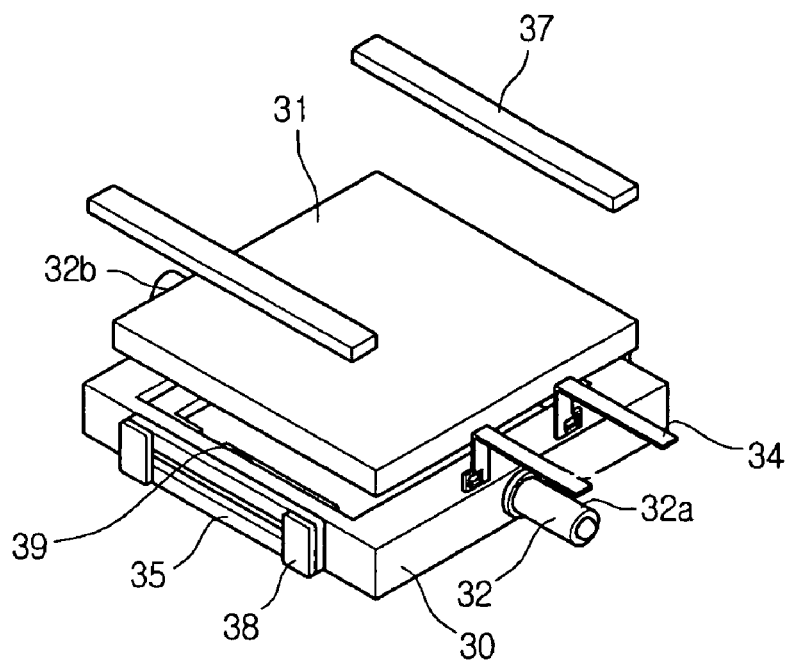
FIG. 10 is a bottom exploded perspective view of a rotating member of the resolution improving apparatus shown in FIG. 8 according to the present invention.
Figure 11:
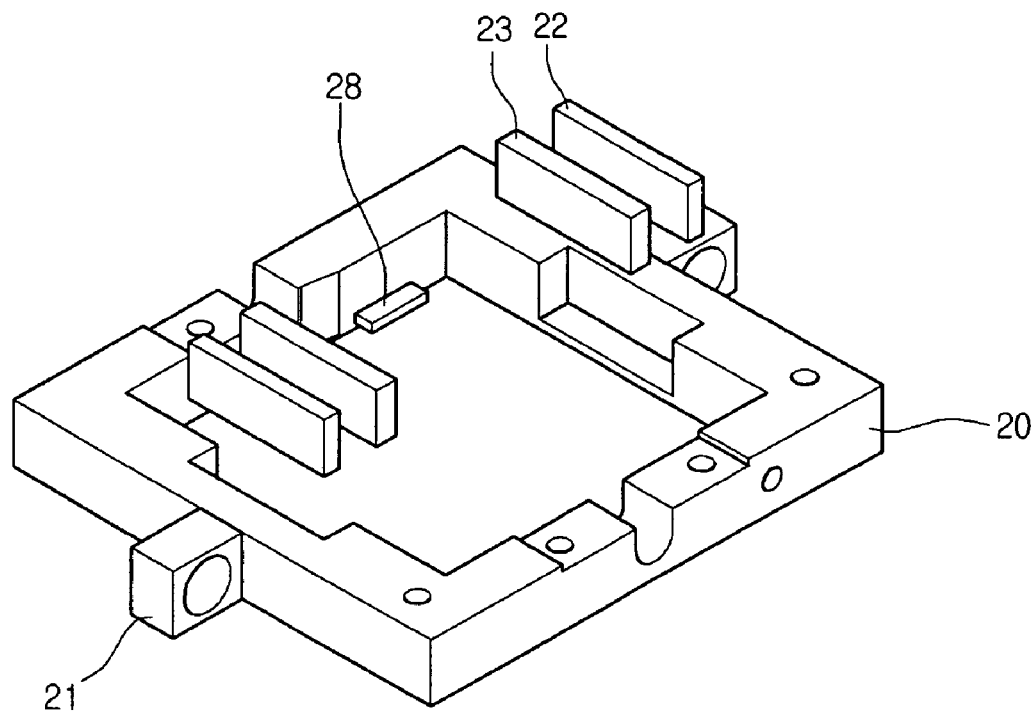
FIG. 11 is an en exploded perspective view of a fixing member of the resolution improving apparatus shown in FIG. 8 according to the present invention.

Particularly, FIG. 8 is a perspective view of the resolution improving apparatus according to the present invention, and FIG. 9 is an exploded perspective view of the resolution improving apparatus shown in FIG. 8. FIG. 10 is a bottom exploded perspective view of a rotating member of the resolution improving apparatus of FIG. 8 according to the present invention, FIG. 11 is an exploded perspective view of a fixing member of the resolution improving apparatus of FIG. 8 according to the present invention, and FIG. 12 a top perspective view of the rotating member according to the present invention.

Referring to FIGS. 8 to 12, the resolution improving apparatus includes a fixing member 20 and a rotating member 30, all operatively coupled.

The fixing member 20 is disposed on an optical path between the image forming unit and the screen and has a fixing part 21 at the sides of the fixing member 20. Although a screw hole is shown in the drawings, other members/ means can also be used to fix the fixing member 20 within the display device.

The fixing member 20 is firmly fixed within the display device along the optical path so that the light impinges on the displacement plate 31.

In addition, a magnet 23 and a yoke 22 are formed at at least one side of the fixing member 20. Preferably, the magnet 23 and the yoke 22 can be formed on only one side or on both sides of the fixing member 20.

Here, the magnet 23 may be a dipole magnet having N and S poles. In addition, the magnet 23 may be a monopole magnet or a multipole magnet.

The magnet 23 drives the rotating member 30 to rotate/ displace by using a magnetic field. The yoke 22 forms a passage of a magnetic field to increases an efficiency of a magnetic field.

The rotating member 30 is rotatably coupled inside of the fixing member 20. FIG. 8 shows that the rotating member 30 is formed in a rectangular or rhombus shape and surrounds the optical path. However, the rotating member 30 can have any structure/shape suitable for fixing the displacement plate 31.

As described above, the displacement plate 31 is a light transmitting element that quickly rotates at a predetermined angle for a short time and thereby changes the position at which an image is displayed. As an example only, the plate 31 can be the plate 11.

For this purpose, the displacement plate 31 may be perpendicular to the optical path or inclined at a predetermined angle. By the operation of the displacement plate 31, the incident angle of the light incident on the displacement plate is periodically changed, the principles of which have been already described above in reference to FIGS. 4-7(b).

The rotating member 30 includes shafts 32 (32a and 32b) on both sides of the rotating member 30 and is rotatably connected to shaft inserting grooves 27 provided in the fixing member 20. Preferably, the rotating member 30 further includes first and second bearings 33 and 36 on the shafts 32a and 32b respectively. Here, the shafts 32 serve as a rotation center axis of the rotating member 30 and/or the displacement plate 31, and the rotation center axis is perpendicular to the optical path.

The first bearing 33 is formed in an approximately cylindrical shape and the shaft 32a is inserted into the first bearing 33. The first bearing 33 is disposed in the shaft inserting groove 27 (e.g., on the right side) of the fixing member 20.

The second bearing 36 disposed on the shaft 32b may have an outer diameter that corresponds to or substantially corresponds to the inserting groove 27 (e.g., on the left side) such that the rotating member 30 can be caught by an inner surface of the fixing member 20.

That is, the rotating member 30 that is inserted into the fixing member 20 is restricted from moving in the left direction (D2 in FIG. 9) due to the second bearing 36, which allows the rotation of the shaft 32b. Also, a leaf spring 24 is formed at the right side to cover an end portion of the first bearing 33, such that the rotating member 30 is restricted from moving in the right direction D1. However, the elasticity of the leaf spring 24 allows a certain proper motion (e.g., rotation) of the shaft 32a while limiting the left and right linear movement of the rotating member 30, such that the rotating member 30 can rotate smoothly within the fixing member 20.

In such a state that only one end of the leaf spring 24 is coupled to the fixing member 20, the leaf spring 24 supports the rotating member 30.

Meanwhile, a first cover 25 and a second cover 26 are disposed respectively on upper sides of the first and second bearings 33 and 36 so that the rotating member 30 cannot be released upwards.

The first cover 25 is coupled to the fixing member 20 by two screws, and the second cover 26 is partially coupled to the fixing member 20 by one screw. Such configuration aims to secure a proper movement of the rotating member 30 to rotate smoothly.

The second cover 26 has a proper elastic force and its operation is similar to the operation of the leaf spring 24. In other words, the second cover 26 serves as an elastic member that can secure the rotating member 30 to the fixing member 20 while allowing a proper and smooth movement of the rotating member 30.

A coil 35 is provided at one or more sides of the rotating member 30. That is, the coil 35 is provided at each side opposing the magnet 23 formed at the fixing member 20.

Figure 12:
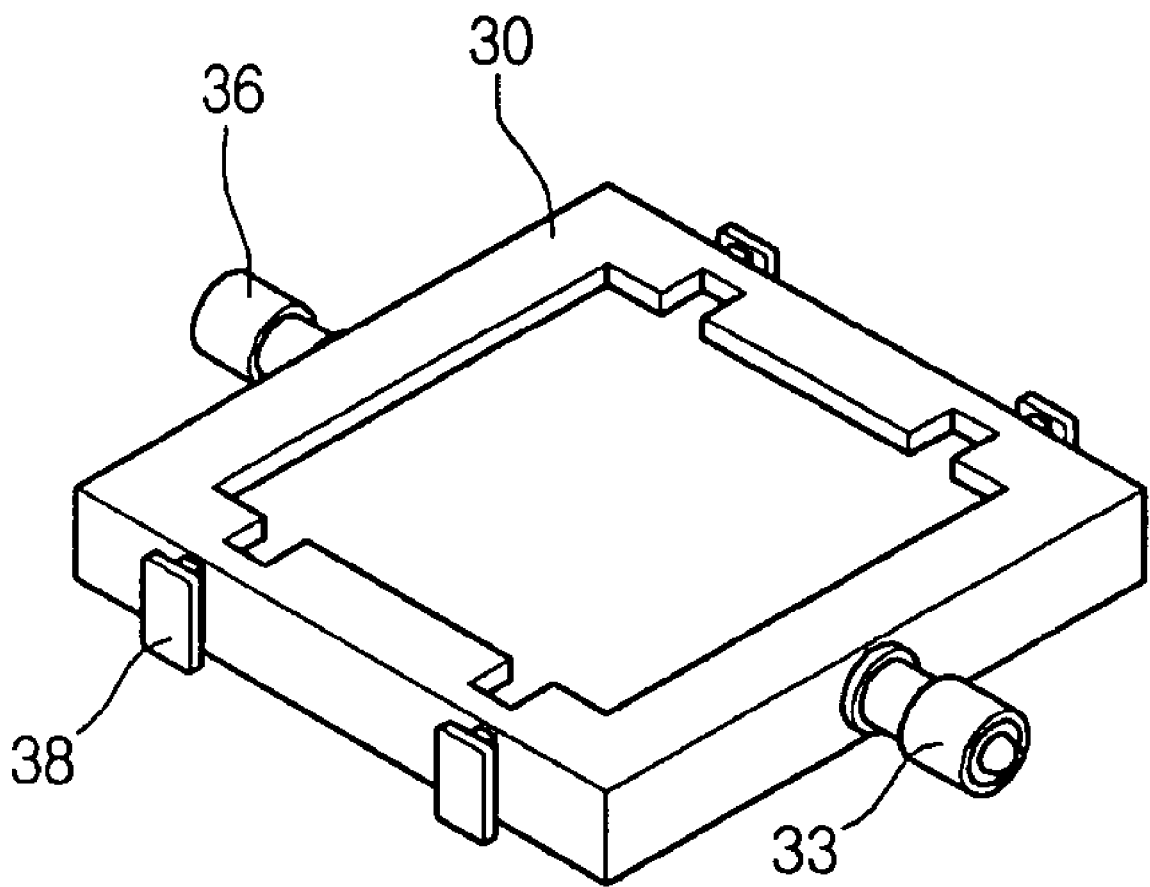
FIG. 12 is a view of the resolution improving apparatus having a coil holder according to the present invention.

Referring to FIG. 12, in order to easily install the coil 35, a coil holder 38 is provided at the side(s) of the rotating member 30, such that the coil 35 is supported and fixed by the coil holder 38. The coil 35 can be formed in a rectangular shape or a racetrack shape or any other suitable shape/configuration. By the operation of the coil 35 and magnet 23, the rotating member 30 can move around along the direction of a current.

That is, when a power is supplied to the coil 35 through a power line 34, a current flows through the coil 35 and thus an attractive force and a repulsive force are generated due to an interaction with the magnet 35 provided at the fixing member 20, thereby driving/moving the rotating member 30 and thus the displacement plate 31. The power supply control of the power line 34 can be done by the signal processing unit 50 and/or other controller in the display device. The power supply control is made in such a manner that the resolution improving principles set forth above in FIGS. 5(a)-7(b) can be realized. In this example, the rotating member 30 rotates about the rotation center axis (along the shafts 32) in a clockwise or counterclockwise direction depending on the direction of the current applied to the coil 35. However, the resolution improving apparatus can be configured to move/rotate the plate 31 in any desired direction.

Although not shown, according to another embodiment, a magnet may be provided at a side of the rotating member. In this embodiment, a coil holder is provided at a side of the fixing member and opposes the magnet, and a coil is supported by the coil holder.

FIG. 10 shows the bottom perspective of the rotating member 30. As shown in FIG. 10, the displacement plate 31 is coupled to the rotating member 30. The displacement plate 31 is positioned on a protrusion 39 formed at an inner side of the rotating member 30, and then fixed by a supporting member 37. A detail shape of the protrusion 39 is shown in FIG. 9.

In another example, the displacement plate 31 may be injected together with the rotating member 30 such that the plate 31 is formed with the rotating member 30. In this case, the displacement plate 31 can be fixed to the rotating member 30 without any additional supporting member 37.

As shown in FIG. 11, a stopper 28 is provided at an inner bottom side of the fixing member 20 so as to limit rotation/displacement angle of the rotating member 30. Thus, due to the stopper 28, the rotation/displacement range of the rotating member 30 is limited to below a predetermined angle to avoid an external impact, an erroneous operation or an excessive operation.

The resolution improving apparatus of the present invention is disposed on the optical path of the display device and is rotated (i.e., its displacement plate) due to the interaction of the coil 35 and the magnet 23 depending on the applied control current.

Preferably, the rotation range of the rotating member 30 can be set within ±0.75° and can be rotated such that it oscillates periodically between the first location and the second location.

The rotating member 30 rotates (e.g., a full oscillation) at least one time while an image signal of one frame is applied.

As described above, an image of one frame is split into the first image and the second image and is periodically displayed at different locations on the screen. In this manner, the user visually feels as if there are a large number of pixels. Thus, by the present invention the resolution can be improved significantly without increasing the number of the pixels in the display device. Accordingly, the resolution of a large-sized display device can be effectively improved at a low cost.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A display device comprising:
    a light source;
    an image forming unit for forming an image by using a light emitted from the light source and an inputted image signal;
    a projection unit for projecting the image formed by the image forming unit onto a screen;
    a displacement unit for displacing the image displayed onto the screen; and
    a driving unit for driving the displacement unit, wherein the displacement unit includes:
        a moveable and light transmitting displacement plate;
        a fixing member; and
        a rotating member coupled to the fixing member and to which the displacement plate is fixed.

2. The display device according to claim 1, wherein the displacement unit further includes:
    a supporting member for supporting and limiting a movement of the rotating member by an elastic force.

3. The display device according to claim 2, wherein the supporting member is a leaf spring.

4. The display device according to claim 2, wherein the supporting member has one side fixed to the fixing member and the other side contacting with the rotating member.

5. The display device according to claim 1, wherein the rotating member is rotatably coupled to the fixing member.

6. The display device according to claim 1, wherein the driving unit includes:
    a coil disposed at the rotating member; and
    a magnet disposed at the fixing member and opposing the coil.

7. The display device according to claim 1, wherein the driving unit includes:
    a coil disposed at the fixing member; and
    a magnet disposed at the rotating member and opposing the coil.

8. The display device according to claim 1, wherein the rotating member has at least one shaft protruding from at least one side of the rotating member and the fixing member has a shaft inserting groove, whereby the rotating member is rotatably coupled to the fixing member.

9. The display device according to claim 8, further comprising at least one bearing provided on the at least one shaft.

10. A display device comprising:
    a light source;
    an image forming unit for forming an image by using a light emitted from the light source and an inputted image signal;
    a projection unit for projecting the image formed by the image forming unit onto a screen;
    an optical path changing unit disposed on an optical path through which the image is projected, for changing an optical path; and
    a driving unit for driving the optical path changing unit, wherein the optical path changing unit includes:
        a moveable and light transmitting displacement plate;
        a fixing member disposed on the optical path; and
        a rotating member rotatably coupled to the fixing member and to which the displacement plate is fixed.

11. The display device according to claim 10, wherein the optical path changing unit further includes:
    a supporting member for supporting and limiting a movement of the rotating member by an elastic force.

12. The display device according to claim 10, wherein the rotating member has a central shaft and rotates about the central shaft within a predetermined angle.

13. A display device comprising:
    a light source;
    an image forming unit for forming an image by using a light emitted from the light source and an inputted image signal;
    a projection unit for projecting the image formed by the image forming unit onto a screen;
    a light transmitting displacement unit rotatably coupled to displace the image displayed on the screen, at least a portion of the displacement unit being supported by an elastic member, such that a part of the displacement unit is freely rotatable; and
    a driving unit for driving the displacement unit.

14. The display device according to claim 13, wherein the displacement unit includes:
    a displacement plate being freely rotatable;
    a fixing member; and
    a rotating member coupled to the fixing member and to which the displacement plate is fixed,
    wherein the elastic member supports the rotating member by an elastic force.

15. The display device according to claim 14, wherein the rotating member is rotatably coupled to the fixing member.

16. The display device according to claim 14, wherein the driving unit includes:
    a coil disposed at the rotating member or the fixing member; and
    a magnet disposed at the fixing member and opposing the coil.

17. The display device according to claim 14, wherein the rotating member has at least one shaft protruding from at least one side of the rotating member and the fixing member has a shaft inserting groove, whereby the rotating member is rotatably coupled to the fixing member.

18. The display device according to claim 17, further comprising at least one bearing provided at the at least one shaft.

19. A resolution enhancing apparatus usable with a display device, the apparatus comprising:
    a movable and light transmitting displacement member for displacing an image impinging thereon;
    a rotating member fixedly supporting the displacement member;
    a fixing member for housing the rotating member and allowing an oscillatory movement of the rotating member; and
    a controller for controlling the oscillatory movement of the rotating member during a cycle of an image signal, whereby a resolution of the display device is enhanced.

20. The resolution enhancing apparatus according to claim 19, wherein the rotating member and the fixing member are disposed concentrically with respect to each other.

* * * * *